Patented Oct. 13, 1931

1,826,806

UNITED STATES PATENT OFFICE

JOHN WESLEY MARDEN AND HARVEY CLAYTON RENTSCHLER, OF EAST ORANGE, NEW JERSEY, ASSIGNORS TO WESTINGHOUSE LAMP COMPANY, A CORPORATION OF PENNSYLVANIA

PREPARATION OF AN OXIDE-FREE HALIDE OF A RARE REFRACTORY METAL

No Drawing. Original application filed March 17, 1924, Serial No. 699,942. Divided and this application filed February 16, 1927. Serial No. 168,826.

This application is a division of application Serial No. 699,942, filed March 17, 1924, assigned to the same assignee as the present application.

This invention relates to the preparation of rare refractory metal compounds and more particularly to a process for producing an oxide-free halide of such metals.

One of the objects of our invention is to provide a process for preparing an oxide-free halide salt of a refractory metal.

Another object of our invention is to provide a process for preparing salts of the refractory metals which are free from water of crystallization.

In the U. S. patent to Marden 1,437,984, granted December 5, 1922, a method is disclosed for the production of the rare metals in the powder or coherent form by reducing a halide of the metal by means of aluminum or iron under suitable conditions.

The invention described in the aforesaid application is, in a sense, a modification of the process described in the aforesaid patent and is especially suitable for the production of fused uranium which, as is well known by scientists, is very difficult to obtain in such condition and free from any contaminations which deleteriously affect the properties of the metal such as its electro-conductivity and the like.

In the preparation of fused rare metals, for example, the invention described in the parent application first contemplates the production of a pure oxide-free halide salt of the metal and to secure this end we have devised a special chemical process which may be employed, although it is obvious that other methods might be suitably modified to obtain the salt in the condition stated, and, secondly, we have employed as a reducing agent a substance which volatilizes readily so that the rare metal may be freed without difficulty therefrom. The reducing substance preferably employed by us, is one which may be obtained in substantially 100% purity. The present invention relates only to the first step mentioned.

The oxide-free uranium salt may be prepared by the following process which is given for illustrative purposes only.

Two hundred grams of uranyl acetate may be dissolved in distilled water and filtered into a suitable receptacle such as a wooden or rubber pail. To this solution may be added a solution obtained by dissolving 200 grams of potassium fluoride, or, if desired, sodium flouride, and this latter solution may then be filtered to remove impurities, such as shavings and the like, and the two clear filtered solutions thoroughly mixed together. To this mixture of uranyl and potassium or sodium fluoride, there may be added 60 cubic centimeters of hydro-fluoric acid and approximately 60 cubic centimeters of formic acid or any other suitable reducing agent for producing slow crystallization of the salt. No precipitation occurs on the addition of these acids and the combined solutions will be found to be of a clear yellow color. The reaction may be effected by subjecting the solution to light, such as sunlight which, as known, contains ultra-violet light. The exposure to sunlight should be continued until the action is complete, at which time the solution becomes quite colorless, and substantially all the uranium salts are precipitated in the form of a fine, crystalline, bright-green-color precipitate.

The reaction which takes place is represented by the following equation:

$$UO_2(C_2H_3O_2)_2 + 3KF + 2HF + HCOOH = KUF_5 + 2H_2O + CO_2 + 2KC_2H_3O_2.$$

The precipitate may be removed from the solution by filtering and thereafter thoroughly washed with distilled water to remove the soluble products mixed with the precipitate and the precipitate is then dried by heating in an oven.

After the precipitate has been thoroughly dried, the water of crystallization may be removed therefrom by fusing. The fusing operation may be accomplished by adding to the potassium-uranium fluoride, i. e., the precipitate, an equal weight of a mixture of equal parts of sodium and potassium chlorides. It is preferable to employ a mixture of sodium and potassium chloride in preference to either of these chlorides alone, for the reason such a mixture melts at a lower temperature and is easier to handle.

The fusion may be accomplished by heating a platinum crucible containing the materials in air over an open flame, in an electric furnace, or in an inert environment, such as hydrogen. The sodium and potassium chlorides may be placed in a crucible of platinum or other suitable material and the potassium-uranium fluoride added, a little at a time, until the fusion is perfectly clear. When this condition has been reached, it is an indication of the complete fusion of the mixture and thereafter the crucible may be covered and the mass allowed to cool.

The fused mass may be removed from the crucible after cooling and ground to pass a 200 mesh sieve, after which it may be suspended in distilled water and washed thoroughly to remove all of the excess of sodium and potassium salts. The residue may be then filtered, washed with alcohol and thereafter dried for approximately one hour at 150° C. in a drying oven. This salt which is a potassium uranium fluoride which is subsequently used in the process, will be found to be free from oxides.

Heretofore, in the preparation of uranium salts, considerable difficulty was experienced in obtaining a precipitate of uranium fluoride which could be filtered and washed, owing to the fact that the precipitate was so finely divided and so very gelatinous, that it would clog the pores of the filter and thus prevent the separation of the precipitate from the solution.

Furthermore, owing to the water present, the latter would decompose and react with the metal to form oxides. By means of our process, these difficulties have been overcome and we are able to secure a course uranium fluoride which may be filtered very readily and which may afterwards be fused and obtained in the oxide-free condition.

Modifications of the foregoing process may suggest themselves to those skilled in the art, but it is to be appreciated that such modifications are contemplated by us as fall within the scope of the appended claims.

What is claimed is:

1. The method of removing water of crystallization from uranium double alkali metal fluorides which comprises fusing said compound with an alkali metal halide flux substantially non-reactive therewith and substantially free from oxygen containing compounds.

2. The method of dehydrating uranium-potassium fluoride ($KUF_5$ plus water of crystallization) which comprises fusing said compound with a flux comprised of equal parts sodium and potassium chlorides.

3. The method of forming an anhydrous oxide-free double uranium alkali metal fluoride which comprises initially forming a crystalline double fluoride compound by precipitation from aqueous solution and thereafter fusing said crystalline compound with a flux comprised substantially of equal parts sodium and potassium chlorides.

4. The method of forming an anhydrous exide-free double uranium alkali metal fluoride which comprises initially forming a crystalline double fluoride compound containing water of crystallization by precipitation from aqueous solution and thereafter fusing said crystalline compound with alkali metal chlorides to remove the water of crystallization therefrom, said fusion operation being performed with the exclusion of air and oxygen containing compounds.

In testimony whereof, we have hereunto subscribed our names this 15th day of February, 1927.

JOHN WESLEY MARDEN.
HARVEY CLAYTON RENTSCHLER.